Patented May 6, 1930

1,757,455

UNITED STATES PATENT OFFICE

HANS FRANZEN AND MARTIN LUTHER, OF MANNHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

BLEACHING AND DEODORIZING OXIDATION PRODUCTS OF HIGH-MOLECULAR HYDROCARBONS

No Drawing. Application filed January 5, 1929, Serial No. 330,628, and in Germany February 4, 1928.

The present invention relates to improvements in bleaching and deodorizing oxidation products of high-molecular hydrocarbons.

The products obtainable by an oxidation of high-molecular hydrocarbons, especially of paraffin wax, possess rather often a dark color and a disagreeable smell in the crude state as well as after a purification according to the methods hitherto employed, which properties reduce the value of the products, for example, in the manufacture of soap, the soap retaining the smell and color of the initial materials.

We have now found that these products can be converted into pale colored materials with an agreeable smell or without any smell altogether by treating the said products with hydrogen. The reduction can be performed, for example, by a treatment with metals and acids forming hydrogen, or electrolytically. Suitable agents are, for example, zinc or iron and aqueous sulphuric acid. The reduction can be performed in stages by adding, for example, when the process is performed by means of metals and aqueous solutions of acids, at first only some part of the reducing agent required, drawing then off the waste solution, adding a further quantity of reducing agent, and so on until the desired effect is attained. The initial materials can also be purified, from the unsaponifiable matter for example, by extraction with solvents such as methanol or pyridine, or by a treatment with adsorption agents, such as fuller's earth, animal charcoal, kieselguhr and the like, and/or an aftertreatment of the bleached product with such agents can be performed. The treatment can be carried out in the cold as well as while heating, for example, up to about 100° C.

The products obtainable when working in accordance with the aforedescribed process are of high value for all branches of the industry which employ fatty acids, and particularly for the manufacture of soap.

The following examples will further illustrate the nature of this invention, but the invention is not restricted to these examples.

*Example 1*

1000 parts of a crude, dark colored and bad smelling oxidation product of paraffin wax are intimately mixed at 70° C., while stirring, with 50 parts of zinc powder whereupon 1000 parts of an aqueous 20 per cent sulphuric acid are added, whereby the single components mix with each other with the formation of an emulsion. After stirring for 1 hour during which period of time the temperature is slowly raised to about 90° to 95° C., the mixture is allowed to settle, whereby two layers are formed. The acid lower layer is then removed and the bleached oily product is washed with water until no sulphuric acid is detected. The final product obtained possesses a pale color and is particularly suitable for the manufacture of pale soap.

*Example 2*

1000 parts of a crude, nearly black colored and bad smelling mixture of fatty acids obtained by an oxidation of paraffin wax and freed from all by-products, such as remainders of paraffin wax or alcohols, is heated while stirring, to a temperature of 90° C. 20 parts of zinc powder and subsequently 1000 parts of an aqueous 12 per cent hydrochloric acid are run into the liquid in such a manner that an emulsion is obtained. After stirring for half an hour at 90° to 100° C., the mass is allowed to settle and the aqueous lower layer is then drawn off. The product is then treated again in the same manner as set out. The bleached mixture of fatty acids is then washed as described in Example 1, a pale yellow product without any substantial smell being finally obtained.

What we claim is:—

1. The process of bleaching and deodorizing oxidation products of high molecular hydrocarbons which comprises treating a colored and bad smelling oxidation product of high-molecular hydrocarbons with hydrogen.

2. The process of bleaching and deodorizing oxidation products of high molecular hydrocarbons which comprises treating a colored and bad smelling oxidation product of high-molecular hydrocarbons with hydrogen while hot.

3. The process of bleaching and deodorizing oxidation products of high molecular hydrocarbons which comprises treating a colored and bad smelling oxidation product of high molecular hydrocarbons with nascent hydrogen.

4. The process of bleaching and deodorizing oxidation products of high molecular hydrocarbons which comprises treating a colored and bad smelling oxidation product of high molecular hydrocarbons with a mixture of a metal and an acid furnishing nascent hydrogen.

5. The process of bleaching and deodorizing oxidation products of paraffin wax comprises treating a colored and bad smelling oxidation product of paraffin wax with nascent hydrogen.

6. The process of bleaching and deodorizing oxidation products of paraffin wax which comprises treating a colored and bad smelling oxidation product of paraffin wax with a mixture of a metal and an acid furnishing nascent hydrogen.

In testimony whereof we have hereunto set our hands.

HANS FRANZEN.
MARTIN LUTHER.